United States Patent [19]

Flannery et al.

[11] 4,273,586
[45] Jun. 16, 1981

[54] TINTED GLASSWARE

[75] Inventors: James E. Flannery; David W. Morgan, both of Corning; Sara E. Rosplock, Campbell, all of N.Y.; Stella A. Sczerbaniewicz, Inwood, W. Va.

[73] Assignee: Corning Glass Works, Corning, N.Y.

[21] Appl. No.: 161,760

[22] Filed: Jun. 23, 1980

[51] Int. Cl.$^3$ .............................................. C03C 3/04
[52] U.S. Cl. .................................................. 106/52
[58] Field of Search ...................................... 106/52

[56] References Cited

U.S. PATENT DOCUMENTS

| | | | |
|---|---|---|---|
| 2,669,808 | 2/1954 | Duncan et al. | 106/52 |
| 2,693,422 | 11/1954 | Duncan et al. | 106/52 |
| 2,901,366 | 8/1959 | Smith et al. | 106/52 |
| 2,956,892 | 10/1960 | Duncan | 106/52 |
| 2,965,503 | 12/1960 | Hagedorn et al. | 106/52 |
| 3,143,683 | 8/1964 | Duncan et al. | 106/52 |
| 4,093,468 | 6/1978 | Boitel et al. | 106/39.7 |

*Primary Examiner*—O. R. Vertiz
*Assistant Examiner*—Mark Bell

*Attorney, Agent, or Firm*—Clinton S. Janes, Jr.

[57] ABSTRACT

This invention is directed to transparent glass which, after thermal tempering demonstrates a tint defined by C.I.E. chromaticity coordinates and transmission utilizing Illuminant C of $x = 0.3300 \pm 0.0040$
$y = 0.3360 \pm 0.0040$
$Y = 60.8 \pm 4$ The glass consists essentially, in weight percent on the oxide basis, of

| | |
|---|---|
| $SiO_2$ | 75 ±2.0 |
| $Na_2O$ | 13.45 ± 0.5 |
| $Al_2O_3$ | 165 ± 0.2 |
| $CaO$ | 9.6 ± 0.3 |
| $As_2O_3$ | 0.15 ± 0.1 |
| $NiO$ | 0.03 ± 0.005 |
| with | |
| $Cr_2O_3$ | 0.002 ± 0.0005 |
| or | |
| $CuO$ | 0.005 ± 0.002 |

2 Claims, No Drawings

TINTED GLASSWARE

BACKGROUND OF THE INVENTION

Glass-ceramic bodies have been employed extensively in the manufacture of culinary ware. Such materials have been utilized in that application both in the opaque state and in the transparent state. U.S. Pat. No. 4,093,468 describes one family of essentially transparent glass-ceramic compositions demonstrating chemical and physical properties suitable for use as culinary ware.

That patent discloses the production of glass-ceramic articles having base compositions within the $Li_2O$—$Al_2O_3$—$SiO_2$ system, but which also contains $TiO_2$ as a nucleating agent and $Fe_2O_3$ as an impurity customarily present in the batch materials. The combination of $TiO_2$ and $Fe_2O_3$ causes the development of a yellowish coloration in the glass-ceramic products. The patent teaches the addition of neodymium oxide ($Nd_2O_3$) to the batch ingredients to act as a decolorizing agent. As can be seen from the working examples reported in the specification, however, the final crystalline articles most frequently display a residual trace coloration.

One essentially transparent glass-ceramic composition utilizing the decolorizing effect imparted by $Nd_2O_3$ which exhibits the necessary melting and forming character for the commercial production of culinary ware, coupled with the chemical and physical properties required therein, demonstrates the following CIE chromaticity coordinates and transmission utilizing Illuminant C with ground and polished plates having a thickness of 6 mm.

x=0.3300±0.0040
y=0.3360±0.0040
Y=64±4
Dominant Wave Length (λ)=578 nm
% saturation=10.5±1

It is well-recognized that many types of culinary utensils, e.g., pots, casseroles, skillets, etc., require covers when used in certain kinds of cooking applications. For ease in monitoring the progress of cooking, a transparent cover has been deemed desirable. It is apparent that such a cover could be produced from a transparent glass-ceramic; perhaps the same glass-ceramic from which the utensil was produced. Because of the inherent greater cost of glass-ceramic materials, coupled with the fact that the cover customarily does not experience the severe mechanical and thermal shocks witnessed by the base ware, glass has been the predominant transparent material employed as covers for such utensils.

Accordingly, the primary objective of the present invention is to prepare glass compositions exhibiting the melting and forming capabilities necessary for shaping into covers for culinary utensils along with the chemical and physical properties intrinsically required in covers utilized for culinary ware. And most importantly, for aesthetic reasons, the glass should demonstrate a tint closely matching that of the glass-ceramic ware.

SUMMARY OF THE INVENTION

We have found that a transparent, thermally tempered glass closely approximating the following CIE chromaticity coordinates and transmission utilizing Illuminant C with ground and polished plates having a thickness of 6 mm.

x=0.3300±0.0040
y=0.3360±0.0040
Y=60.8±4
Dominant Wave Length (λ)=578 nm
% Saturation=10.5±1 can be prepared from a soda lime-based glass having a composition consisting essentially, expressed in terms of weight percent on the oxide basis, of about

| | | |
|---|---|---|
| $SiO_2$ | | 75 ±2.0 |
| $Na_2O$ | | 13.45 ± 0.5 |
| $Al_2O_3$ | | 165 ± 0.2 |
| CaO | | 9.6 ± 0.3 |
| $As_2O_3$ | | 0.15 ± 0.1 |
| NiO | | 0.03 ± 0.005 |
| | with | |
| $Cr_2O_3$ | | 0.002 ± 0.0005 |
| | or | |
| CuO | | 0.005 ± 0.002 |

Melting of the glass will be carried out under oxidizing conditions and the glass is arsenic fined. Such glasses demonstrate a very slight tint which is very compatible with that of the above-described glass-ceramic.

The $Ni^{+2}$ ion can be present in a glass structure in either a four-fold or six-fold coordination. When present in four-fold coordination, the $Ni^{+2}$ ion imparts a purple coloration to the glass. In contrast, the six-fold coordination provides a yellow coloration to the glass. The ratio of $Ni^{+2}$ ions in the four-fold coordination to those in the six-fold coordination is governed by three factors, viz., the base glass composition, the thermal history to which the glass is subjected, and the actual concentration of $Ni^{+2}$ ions.

The effect of thermal history upon the coordination state assumed by $Ni^{+2}$ ions in glass and the consequent coloration resulting therefrom has been studied in some depth. Thus, we have learned that when NiO-containing glass articles having compositions within the above-cited ranges are annealed, i.e., the articles shaped from molten glass are cooled slowly to room temperature, the $Ni^{+2}$ ions apparently assume a predominantly six-fold coordination since a quite palpable yellow coloration is observed in the glass. Contrariwise, when glass articles of comparable compositions are quickly chilled to room temperature from the molten state, as occurs during thermal tempering, the $Ni^{+2}$ ions apparently adopt a four-fold coordination inasmuch as the glass exhibits a purple coloration. It is conjectured that the $Ni^{+2}$ ions tend to exist in four-fold coordination at high-temperatures and the sudden cooling during thermal tempering does not permit sufficient time for the high temperature state of the $Ni^{+2}$ ions to be transformed to six-fold coordination.

This change of coordination states of the $Ni^{+2}$ ions is of vital practical significance in the present invention since glass covers for use with culinary ware are conventionally thermally tempered to enhance the mechanical strength and thermal shock resistance thereof. Consequently, the final color of the article will be that demonstrated after the thermal tempering treatment.

Chromium can be present in the above-cited base glass compositions in either the $Cr^{+3}$ or $Cr^{+6}$ state. $Cr^{+3}$ ions impart a green coloration to such glasses and $Cr^{+6}$ ions produce a yellow coloration therein. The state of the chromium ions in the glasses is determined by redox reactions taking place during melting of the glass. Those reactions are influenced by the melting atmosphere, the temperatures employed in melting, and the inclusion of oxidizing and reducing agents in the batch.

The components of the base glass can also affect the final color of the glass; e.g., $Na_2O$, CaO, and $Al_2O_3$ can modify existing color centers and impurities, such as $Fe_2O_3$, can establish their own color centers.

Therefore, to achieve glass articles of the desired tint, the above-cited ranges of glass constituents must be closely followed and the melting and forming of the glass will be carried out under oxidizing conditions.

DESCRIPTION OF THE PREFERRED EMBODIMENTS

Table I records the batch compositions of a number of glasses, expressed in parts by weight on the oxide basis, which serve to illustrate the compositional parameters of the instant invention. The actual batch ingredients may comprise any materials, either oxides or other compounds, which, when melted together with the remaining batch components, will be converted to the desired oxide in the proper proportions. Because the sum of the tabulated individual constituents totals or approximately totals 100, for all practical purposes the values recited for each ingredient may be considered as reflecting weight percent.

The following description refers to laboratory scale melting only. Nevertheless, it must be understood that the recited compositions would also be useful in large scale, commercial glassmelting units so long as the melting was conducted under oxidizing conditions.

Batches for the several illustrative examples were compounded, the ingredients ballmilled together to assist in insuring a homogeneous melt, and then placed into a small batch-type, pilot plant furnace having sufficient capacity to permit small glass covers suitable for use with small culinary vessels to be pressed therefrom. The furnace operated with an oxidizing atmosphere at temperatures between about 1450°–1600° C. The covers were immediately transferred to an annealer operating at about 550° C. The $Fe_2O_3$ was an impurity present in the batch materials.

Samples were cut from the covers, ground and polished to a thickness dimension of 6 mm, thermally tempered by air chilling at 685° C., and the chromaticity coordinates and transmissions thereof measured utilizing Illuminant C. Those values are reported for Examples 1–14 in TAble II along with determinations of softening point (S.P.) in °C., annealing point (A.P.) in °C., strain point (St. P.) in °C., and coefficient of thermal expansion (Exp.) over the range of 25°–300° C. in terms of $\times 10^{-7}/°C$. where measured on several samples.

TABLE II

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| S.P. | 733 | 729 | 728 | 727 | — | 756 | 728 | 728 | 728 | 731 | 734 | 734 | 731 | 730 |
| A.P. | 546 | 543 | 545 | 545 | — | 543 | 541 | 543 | 545 | 549 | 546 | 548 | 546 | 550 |
| St.P. | 505 | 500 | 505 | 505 | — | 503 | 499 | 502 | 505 | 509 | 506 | 503 | 505 | 510 |
| Exp. | 82 | 84.5 | 84.6 | 84.9 | — | 83.8 | 84.3 | 84.5 | 83.2 | 83.5 | 82.7 | 80.9 | 84.4 | 85.0 |
| X | 0.3222 | 0.3256 | 0.3249 | 0.3269 | 0.3251 | 0.3244 | 0.3212 | 0.3227 | 0.3210 | 0.3206 | 0.3286 | 0.3316 | 0.3304 | 0.3269 |
| Y | 0.3291 | 0.3303 | 0.3291 | 0.3341 | 0.3310 | 0.3307 | 0.3282 | 0.3297 | 0.3298 | 0.3274 | 0.3342 | 0.3371 | 0.3360 | 0.3321 |
| Y | 70.3 | 66.6 | 65.1 | 64.0 | 65.4 | 62.9 | 67.9 | 69.1 | 72.0 | 73.2 | 61.9 | 57.5 | 57.7 | 60.8 |

An analysis of Tables I and II readily evidences the need for extreme control in glass composition to achieve the demanded color properties. Example 14 constitutes the most preferred composition.

We claim:

1. A transparent glass which, after thermal tempering, exhibits the following C.I.E. chromaticity coordinates and transmission utilizing Illuminant C $x = 0.3300 \pm 0.0040$
$y = 0.3360 \pm 0.0040$
$Y = 60.8 \pm 4$ consisting essentially, expressed in weight percent on the oxide basis, of

| | | |
|---|---|---|
| $SiO_2$ | | 75 ± 2.0 |
| $Na_2O$ | | 13.45 ± 0.5 |
| $Al_2O_3$ | | 165 ± 0.2 |
| CaO | | 9.6 ± 0.3 |
| $As_2O_3$ | | 0.15 ± 0.1 |
| NiO | | 0.03 ± 0.005 |
| | with | |
| $Cr_2O_3$ | | 0.002 ± 0.0005 |
| | or | |
| CuO | | 0.005 ± 0.002 |

2. A transparent glass according to claim 1 consisting essentially, expressed in weight percent on the oxide basis, of

| | |
|---|---|
| $SiO_2$ | 75.11 |
| $Na_2O$ | 13.45 |
| $Al_2O_3$ | 1.65 |
| CaO | 9.60 |
| $As_2O_3$ | 0.15 |
| NiO | 0.029 |
| $Cr_2O_3$ | 0.002. |

TABLE I

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 75.87 | 75.59 | 74.84 | 74.95 | 75.01 | 74.94 | 74.73 | 75.22 | 75.34 | 75.26 | 76.13 | 75.53 | 75.23 | 75.11 |
| $Na_2O$ | 12.97 | 13.37 | 13.69 | 13.52 | 13.60 | 13.57 | 13.73 | 13.40 | 13.42 | 13.20 | 12.90 | 13.10 | 13.18 | 13.45 |
| CaO | 9.40 | 9.26 | 9.66 | 9.62 | 9.44 | 9.65 | 9.72 | 9.54 | 9.42 | 9.73 | 9.17 | 9.46 | 9.68 | 9.60 |
| $Al_2O_3$ | 1.57 | 1.57 | 1.59 | 1.67 | 1.69 | 1.60 | 1.58 | 1.65 | 1.62 | 1.62 | 1.60 | 1.71 | 1.70 | 1.65 |
| $Fe_2O_3$ | 0.016 | 0.031 | 0.031 | 0.054 | 0.056 | 0.023 | 0.018 | 0.016 | 0.028 | 0.024 | 0.017 | 0.017 | 0.028 | 0.01 |
| NiO | 0.021 | 0.033 | 0.027 | 0.027 | 0.026 | 0.029 | 0.024 | 0.023 | 0.017 | 0.017 | 0.029 | 0.033 | 0.034 | 0.029 |
| $As_2O_3$ | 0.15 | 0.15 | 0.15 | 0.15 | 0.15 | 0.15 | 0.15 | 0.15 | 0.15 | 0.15 | 0.15 | 0.15 | 0.15 | 0.15 |
| CuO | — | — | 0.008 | 0.006 | 0.024 | 0.034 | 0.044 | | | | | | | |
| $Cr_2O_3$ | | | | | | | | | 0.0059 | 0.0025 | 0.0021 | 0.0034 | 0.0028 | 0.0020 |

* * * * *

UNITED STATES PATENT AND TRADEMARK OFFICE
CERTIFICATE OF CORRECTION

PATENT NO. : 4,273,586
DATED : June 16, 1981
INVENTOR(S) : James E. Flannery et al.

It is certified that error appears in the above-identified patent and that said Letters Patent are hereby corrected as shown below:

In Abstract, line 13, second column, "165" should read -- 1.65 --.

Column 1, line 15, "contains" should be -- contain --.

Column 2, line 16, "165" should be -- 1.65 --.

Column 3, line 16, change "X" to -- x --.

Column 3, line 17, change "Y" to -- y --.

Column 4, line 37, change "165" to -- 1.65 --.

Signed and Sealed this

Thirteenth Day of October 1981

[SEAL]

Attest:

GERALD J. MOSSINGHOFF

Attesting Officer

Commissioner of Patents and Trademarks